United States Patent
Fansler

(10) Patent No.: US 9,518,839 B2
(45) Date of Patent: Dec. 13, 2016

(54) WAVELET BASED MONITORING OF SYSTEM PARAMETERS

(71) Applicant: Aaron A. D. Fansler, Idaho Falls, ID (US)

(72) Inventor: Aaron A. D. Fansler, Idaho Falls, ID (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 431 days.

(21) Appl. No.: 14/090,865

(22) Filed: Nov. 26, 2013

(65) Prior Publication Data

US 2015/0149119 A1    May 28, 2015

(51) Int. Cl.
- *G01D 5/00* (2006.01)
- *G01D 7/00* (2006.01)
- *G05B 23/02* (2006.01)

(52) U.S. Cl.
CPC ........ *G01D 5/00* (2013.01); *G01D 7/00* (2013.01); *G05B 23/0221* (2013.01); *G05B 23/0235* (2013.01); *G05B 23/0281* (2013.01)

(58) Field of Classification Search
CPC . G06F 19/00; G05B 23/0221; G05B 23/0235; G05B 23/0281; G05B 23/024; G05B 23/0254
See application file for complete search history.

(56) References Cited

U.S. PATENT DOCUMENTS

| | | |
|---|---|---|
| 2004/0024568 A1 | 2/2004 | Eryurek et al. |
| 2006/0036404 A1 | 2/2006 | Wiklund et al. |
| 2007/0260346 A1* | 11/2007 | Ganesan ............... G05B 11/42 700/108 |
| 2009/0177439 A1 | 7/2009 | Samples et al. |

FOREIGN PATENT DOCUMENTS

JP     2005266965 A     9/2005

OTHER PUBLICATIONS

Mertins "Signal Analysis: Wavelets, Filter Banks, Time-Frequency Transforms and Applications—Chapter 8: Wavelet Transform", Jan. 1, 1999, pp. 210-264.

Salagean et al., "Anomaly Detection of Network Traffic Based on Analytical Discrete Wavelet Transform", Communications, 2010 8th International Conference on, IEEE, Piscataway, NJ, Jun. 10, 2010, pp. 49-52.

PCT International Search Report and Written Opinion for PCT/US2014/065247, mailed Feb. 23, 2015, pp. 1-26.

\* cited by examiner

*Primary Examiner* — Toan Le
(74) *Attorney, Agent, or Firm* — Tarolli, Sundheim, Covell & Tummino LLP

(57) ABSTRACT

Systems and methods are provided for monitoring parameters within a system. A plurality of sensors each monitor at least one parameter associated with the system. A controller is configured to receive a signal representing the monitored at least one parameter from each of the plurality of sensors and adjust a function of the system based on the received signal. Respective discrete wavelet transform components are associated with each of the plurality of sensors. Each of the discrete wavelet transform components is configured to provide a set of discrete wavelet transform coefficients, representing a content of the signal for its associated sensor, to a discrete wavelet transform monitoring component.

16 Claims, 2 Drawing Sheets

WAVELET BASED MONITORING OF SYSTEM PARAMETERS

FIELD OF THE INVENTION

The invention relates generally to industrial control systems and, more specifically, to wavelet based monitoring of system parameters.

BACKGROUND OF THE INVENTION

Industrial control system (ICS) is a general term that encompasses several types of control systems used in industrial production, including supervisory control and data acquisition (SCADA) systems, distributed control systems (DCS), and other smaller control system configurations such as programmable logic controllers (PLC) often found in the industrial sectors and critical infrastructures. Industrial control systems are typically used in industries such as electrical, water, oil, gas and data.

SUMMARY OF THE INVENTION

In accordance with an aspect of the present invention, a system includes a plurality of sensors, each monitoring at least one parameter associated with the system. A controller is configured to receive a signal representing the monitored at least one parameter from each of the plurality of sensors and adjust a function of the system based on the received signal. Respective discrete wavelet transform components are associated with each of the plurality of sensors. Each of the discrete wavelet transform components is configured to provide a set of discrete wavelet transform coefficients, representing a content of the signal for its associated sensor, to a discrete wavelet transform monitoring component.

In accordance with another aspect of the present invention, a method includes monitoring a parameter associated with a system at each of a plurality of sensors to provide respective sensor signals representing the parameter and decomposing each of the plurality of sensor signals via a wavelet transform to provide a set of wavelet transform coefficients for each signal. The sets of wavelet transform coefficients are monitored for aberrant coefficients and an operator is alerted if an aberrant coefficient is detected.

In accordance with yet another aspect of the present invention, an industrial control system is provided. A plurality of sensors are located at a specific points in the industrial control system and are configured to monitor at least one of a power, voltage, current, flow rate, pressure, temperature, humidity, and chemical concentration associated with the industrial control system. A controller is configured to receive a signal representing the monitored at least one parameter from each of the plurality of sensors and adjust a function of the system based on the received signals. Respective discrete wavelet transform components are associated with each of the plurality of sensors. Each of the discrete wavelet transform components is configured to provide a set of discrete wavelet transform coefficients representing a content of the signal for its associated sensor to a discrete wavelet transform monitoring component associated with the controller.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

Figure 1:
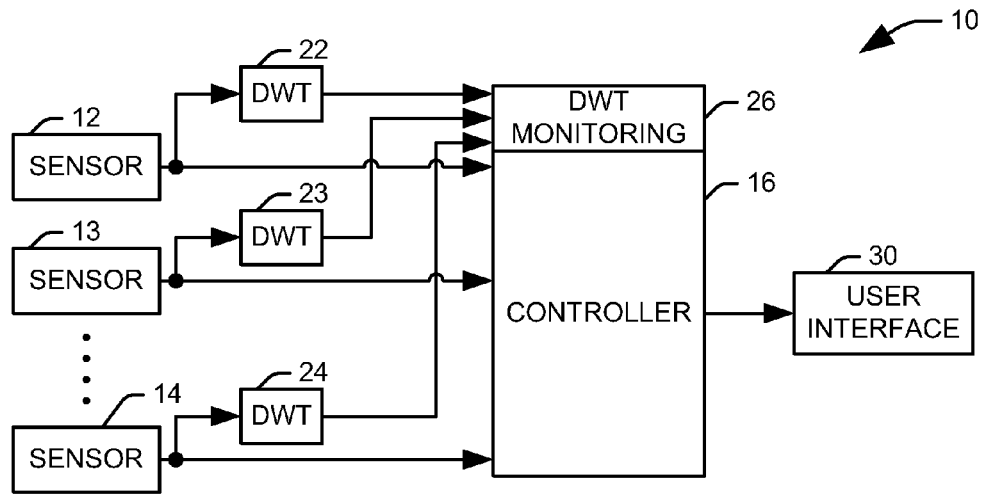
FIG. 1 illustrates one example of a system in accordance with an aspect of the present invention.

FIG. 1 illustrates one example of a system 10 in accordance with an aspect of the present invention. The system 10 includes a plurality of sensors 12-14 that each monitor at least one parameter associated with the system. For example, the sensors could measure, at a given point within the system 10, one or more of power, voltage, current, flow rate, pressure, temperature, humidity, chemical concentration, or any other appropriate parameter of interest. Each sensor 12-14 provides a signal representing the monitored parameters to a controller 16, which is configured to adjust a function of the system based on the received signal. For example, the controller 16 can construct one or more active components (not shown) of the system 10 to alter their behavior in response to the monitored parameters.

In accordance with an aspect of the present invention, each of the plurality of sensors can have an associated discrete wavelet transform (DWT) component 22-24. Each of the discrete wavelet transform components 22-24 is configured to provide a set of discrete wavelet transform coefficients representing a content of the signal provided by its associated sensor to a discrete wavelet transform monitoring component 26. In one implementation, the discrete wavelet transform monitoring component 26 can determine when a coefficient provided by one of the discrete wavelet transform components 22-24 falls outside of a range of expected values. For example, the range of expected values can be determined for each coefficient according to historical behavior of the system. In another example, the range of expected values can be set by an operator according to known system requirements.

Once an aberrant coefficient has been detected, the corresponding signal can be analyzed to identify an anomaly within the system represented by the aberrant coefficient. For example, the corresponding signal can be reconstructed from its associated coefficients and the reconstructed signal can be analyzed to determine the source of an anomaly. In one implementation, a pulse width and height of the signal can be reviewed. Alternatively or additionally, the reconstructed signal can be constructed only from the aberrant coefficients, such that the reconstructed signal represents the anomalous portion of the signal. Once an anomaly is detected, a user can be notified at a user interface 30 to allow corrective action to be taken. Where identification of the anomaly is possible, this information can also be provided to the user to facilitate response to the anomaly.

Figure 2:
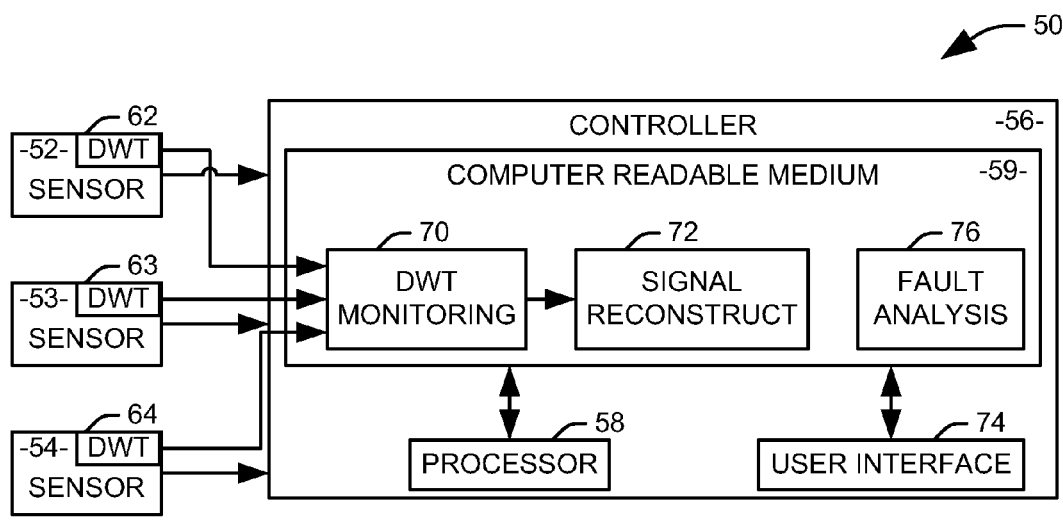
FIG. 2 illustrates one example of a power grid monitoring system in accordance with an aspect of the present invention.

FIG. 2 illustrates one example of a power grid monitoring system 50 in accordance with an aspect of the present invention. The monitoring system 50 includes a plurality of sensors assemblies 52-54 each configured to monitor one of a voltage, a current, and a power at an associated location within the power grid. In the illustrated system 50, each sensor assemblies 52-54 can be implemented as a single board with a sensor interface operatively connected to a into the power grid, a processor, a network interface for communicating with an associated controller 56, and a non-transitory computer readable medium storing instructions for processing and transmitting the gathered data. Accordingly, each sensor assembly 52-54 is configured to measure the at least one of the voltage, current, and power and provide the measurements over a packet-based network to the controller 56 configured adjust a function of the power grid based on the received measurements. The controller 56 can be implemented, for example, as a server, including a processor 58 and a non-transitory computer readable medium 59 storing a database of the monitored voltage, current, and power values and instructions for detecting values outside of desired ranges.

In accordance with an aspect of the present invention, each sensor assembly 52-54 further comprises a discrete wavelet transform (DWT) 62-64 component configured to represent raw packet traffic as a series of wavelets, which are scaled and shifted versions of a single waveform known as the mother wavelet. The inventors have determined wavelet analysis to be suitable for non-stationary signals produced by infrastructural systems. Specifically, they have determined that the irregularity in shape and compactly supported nature of wavelets make wavelet analysis an ideal tool for analyzing signals of a non-stationary nature, as their fractal nature allows them to analyze signals with discontinuities or sharp changes, while their compactly supported nature enables temporal localization of a signal's features. The wavelet transform extracts local information regarding a signal in time and frequency domains, which can be used to detect the malicious attacks using the changes in data characteristics. The wavelet analysis is capable of revealing aspects of data that other signal analysis techniques miss, such as trends, breakdown points, discontinuities in higher derivatives, and self-similarity. Because wavelet analysis gives different views of data, it can compress or denoise a signal without appreciable degradation of the signal.

Wavelet transforms decompose a given signal into shifted and scaled versions of the mother wavelets, represented by different coefficients called "Approximation Coefficients" and "Detail Coefficients." The different approximations and detail coefficients represent the signal at different resolutions. Accordingly, the inventors have elected to use a discrete wavelet transform in which the discrete scales and the corresponding sampling intervals differ by a factor of two, referred to as dyadic sampling. The approximations are the high-scale, low frequency components of the data stream. The detail coefficients are the low-scale, high-frequency components. The dilation function of the discrete wavelet transform can be represented as a tree of low and high pass filters, with each step transforming the low pass filter. The signal can be passed through a series of high pass and low pass filters to analyze respective functions at each level.

The approximation and detail coefficients from each DWT component 62-64 are provided to a DWT monitoring component 70. In one implementation, the DWT monitoring component 70 is implemented as machine executable instructions at the non-transitory computer readable medium associated with the controller 56. The software portion, which is loaded onto the deployable sensors, uses a complex mathematical algorithm for the development of a "digital fingerprint" of network data. In the illustrated implementation, each coefficient from each DWT component 62-64 has an associated range of expected values, with an operator alerted whenever a DWT coefficient is outside of the associated range. In general, the defined range of values for each discrete wavelet transform coefficient is determined from a historical behavior of the system. For example, the defined range of values for each discrete wavelet transform coefficient is determined as a range that includes all values within three standard deviations from a mean value associated with the discrete wavelet transform coefficient. In the illustrated implementation, the anomalous DWT coefficients can be preserved and passed to a signal reconstruction component 72.

The signal reconstruction component 72 can be configured to reconstruct at least a portion of the signal in response to an alert at a user interface 74. The signal reconstruction component 72 can reconstruct the signal from some or all of the available coefficients to provide a reconstructed signal that can be compared to the received signal to check for discrepancies and/or analyzed to determine the nature and source of the reading. For example, the signal reconstruction component can apply an inverse DWT by inserting zeros into the coefficients representing the signal and convolving the results with low-pass and high-pass filter. In the illustrated implementation, the signal reconstruction component 72 is configured to reconstruct the at least a portion of the signal only from a set of discrete wavelet transform coefficients that fall outside of their associated defined range of values to provide a reconstructed signal representing the specific anomaly.

The reconstructed signal is provided to a fault analysis component 76 configured to evaluate the reconstructed at least a portion of the signal to identify an anomaly represented by the coefficient falling outside of the defined range of values. For example, the reconstructed signal can be compared to the received signal or a stored ideal signal to determine the identity and source of an anomaly. Alternatively, the reconstructed signal could be analyzed to identify the anomaly. In one implementation, the fault analysis component 76 is configured to identify one or more anomalies, their durations, and their intensities from a pulse height and a pulse width associated with the reconstructed signal. The identity and source of the anomaly can then be communicated to the operator via the user interface 74.

Figure 3:
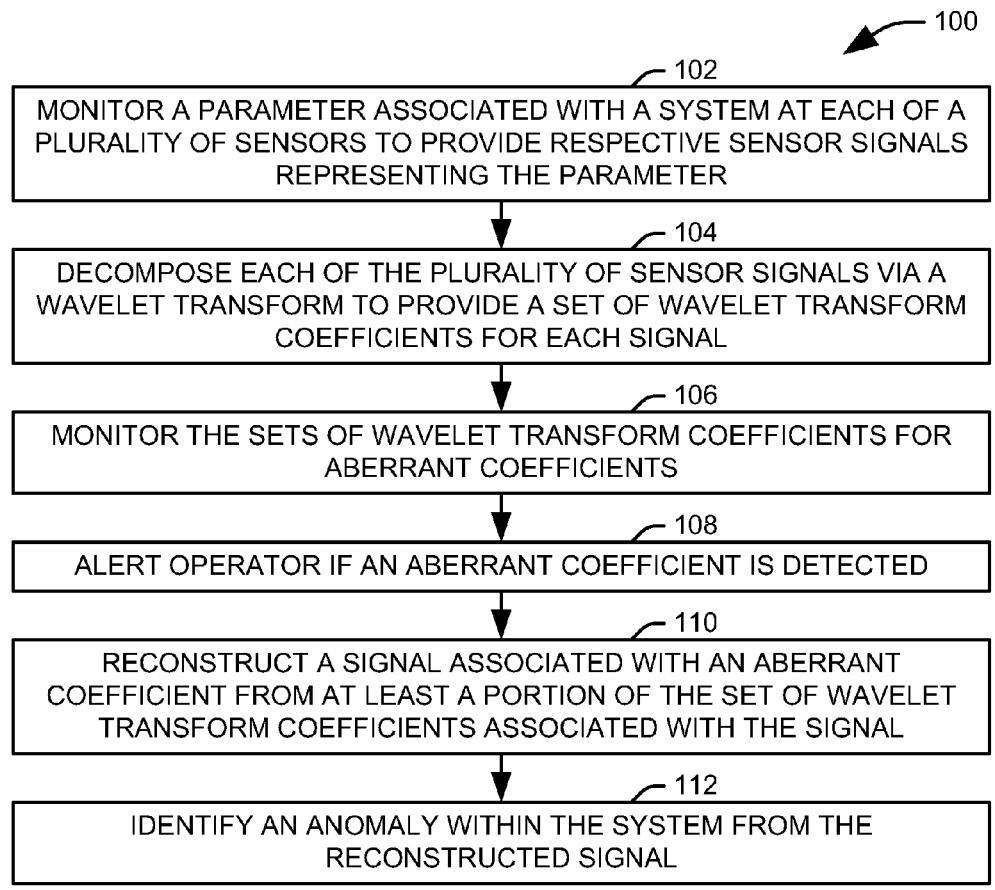
FIG. 3 illustrates a method for monitoring a system in accordance with an aspect of the present invention.

In view of the foregoing structural and functional features described above, an example method will be better appreciated with reference to FIG. 3. While, for purposes of simplicity of explanation, the method of FIG. 3 is shown and described as executing serially, it is to be understood and appreciated that the present invention is not limited by the illustrated order, as some actions could, in other examples, occur in different orders from that shown and described herein or could occur concurrently.

FIG. 3 illustrates a method 100 for monitoring a system in accordance with an aspect of the present invention. At 102, a parameter associated with a system is monitored at each of a plurality of sensors to provide respective sensor signals representing the parameter. For example, the parameter could include flow rates within a network of pipes carrying fluid or gas, voltage, current, or power within a power grid. Each sensor can be implemented, for example, as a dedicated hardware component with a sensor apparatus for detecting the parameter, components for translating a signal associated with the sensor apparatus into digital form, stored instructions, on a non-transitory computer readable medium, for evaluating and processing the signal, and appropriate hardware for transmitting the gathered data to a central controller.

At 104, each of the plurality of sensor signals is decomposed via a wavelet transform to provide a set of wavelet transform coefficients for each signal. For example, a dyadic scale discrete wavelet transform (DWT) can be applied to each signal to provide an associated set of approximation and detail coefficients. Depending on the nature of the received data, the DWT can be implemented as a one-dimensional transform or a multi-dimensional transform. For example, in a two-dimensional DWT, each level of the DWT produces an approximation coefficient that can be used in a next level of the DWT and three detail coefficients, representing horizontal, vertical, and diagonal orientations.

At 106, the sets of wavelet transform coefficients are monitored for aberrant coefficients. In one implementation, each wavelet transform component to an associated range of values specific to that coefficient. For example, the range of values associated with each wavelet transform component can be determined from historical values of the wavelet transform component. In one implementation, an average value of the wavelet transform component is determined over a specified time period and the range of values is defined as a confidence interval around the average value according to an acceptable error rate for the system. At 108, an operator is alerted if an aberrant coefficient is detected.

At 110, a signal associated with an aberrant coefficient is reconstructed from at least a portion of the set of wavelet transform coefficients associated with the signal. For example, the signal can be reconstructed using only those coefficients that fall outside of their associated range of values. At 112, an anomaly within the system is identified from the reconstructed signal. In one implementation, one or more anomalies, their durations, and their intensities from a pulse height and a pulse width associated with the reconstructed signal. This information can then be conveyed to the user via an appropriate user interface.

Figure 4:
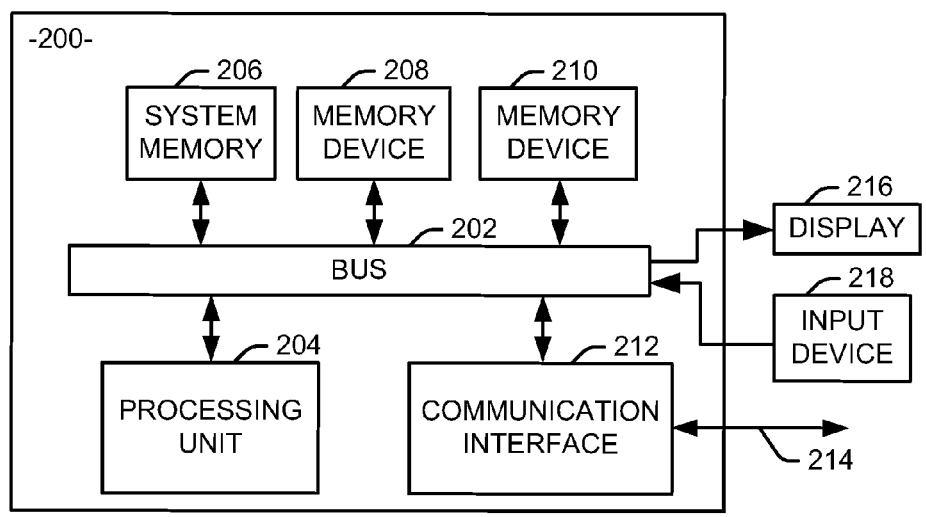
FIG. 4 is a schematic block diagram illustrating an exemplary system of hardware components capable of implementing examples of the systems and methods disclosed in FIGS. 1-3.

FIG. 4 is a schematic block diagram illustrating an exemplary system 200 of hardware components capable of implementing examples of the systems and methods disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a monitoring system in accordance with the present invention. Computer executable logic for implementing the system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution. It will be appreciated that a "computer readable medium" can comprises multiple, operatively connected storage assemblies.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, I claim:

1. A system comprising:
    a plurality of sensors, each monitoring at least one parameter associated with the system;
    a controller configured to receive a signal representing the monitored at least one parameter from each of the plurality of sensors and adjust a function of the system based on the received signals; and
    respective discrete wavelet transform components associated with each of the plurality of sensors, each of the discrete wavelet transform components configured to provide a set of discrete wavelet transform coefficients representing a content of the signal for its associated sensor to a discrete wavelet transform monitoring component;
    a signal reconstruction component configured to reconstruct a portion of the signal only from a set of discrete wavelet transform coefficients that fall outside of associated defined range of values; and
    a fault analysis component configured to evaluate the reconstructed portion of the signal to identify an anomaly that is represented by the set of discrete wavelet transform coefficient falling outside of the defined range of values.

2. The system of claim 1, the discrete wavelet transform monitoring component being configured to alert a user when a discrete wavelet transform coefficient falls outside of a defined range of values.

3. The system of claim 2, further comprising a signal reconstruction component configured to reconstruct at least a portion of the signal in response to an alert.

4. The system of claim 2, wherein the defined range of values for each discrete wavelet transform coefficient is determined from a historical behavior of the system.

5. The system of claim 4, wherein the defined range of values for each discrete wavelet transform coefficient is determined as a range include all values within three standard deviations from a mean value associated with the discrete wavelet transform coefficient.

6. The system of claim 1, wherein each sensor includes a processor and a nontransitory computer readable medium, and the discrete wavelet transform component corresponding to each sensor is implemented as machine readable instructions stored on the non-transitory computer readable medium.

7. The system of claim 1, wherein the controller includes a processor and a nontransitory computer readable medium, and discrete wavelet transform monitoring component is implemented as machine readable instructions stored on the nontransitory computer readable medium.

8. The system of claim 1, wherein each of the discrete wavelet transform components is configured to apply a dyadic scale discrete wavelet transform to its associated signal to provide an associated set of approximation and detail coefficients.

9. The system of claim 1, further comprising a user interface to communicate the anomaly to the operator.

10. A method comprising:
monitoring a parameter associated with a system at each of a plurality of sensors to provide respective sensor signals representing the parameter;
decomposing each of the plurality of sensor signals via an inverse wavelet transform by inserting zeros into coefficients representing the sensor signal to provide a set of wavelet transform coefficients for each signal;
convolving the decomposed sensor signals with low-pass and high-pass filters;
monitoring the sets of wavelet transform coefficients for aberrant coefficients; and
alerting an operator via a user interface if an aberrant coefficient is detected.

11. The method of claim 10, wherein decomposing each of the plurality of sensor signals via the wavelet transform comprises applying a dyadic scale discrete wavelet transform to each signal to provide an associated set of approximation and detail coefficients.

12. The method of claim 10, wherein monitoring the sets of wavelet transform coefficients for aberrant coefficients comprises comparing each wavelet transform coefficient to an associated range of values.

13. The method of claim 12, further comprising determining the range of values associated with each wavelet transform coefficient from historical values of the wavelet transform coefficient.

14. The method of claim 13, wherein determining the range of values associated with each wavelet transform coefficient from historical values of the wavelet transform component comprises:
determining an average value of the wavelet transform coefficient over a specified time period; and
defining the range of values as a confidence interval around the average value according to an acceptable error rate for the system.

15. The method of claim 10, further comprising:
reconstructing a signal associated with an aberrant coefficient from at least a portion of the set of wavelet transform coefficients associated with the signal; and
identifying an anomaly within the system from the reconstructed signal.

16. An industrial control system comprising:
a plurality of sensors, each located at a specific point in the industrial control system and configured to monitor at least one of a power, voltage, current, flow rate, pressure, temperature, humidity, and chemical concentration associated with the industrial control system;
a controller configured to receive a signal representing the monitored at least one parameter from each of the plurality of sensors and adjust a function of the system based on the received signals;
respective discrete wavelet transform components associated with each of the plurality of sensors, each of the discrete wavelet transform components configured to provide a set of discrete wavelet transform coefficients representing a content of the signal for its associated sensor to a discrete wavelet transform monitoring component associated with the controller;
a signal reconstruction component configured to reconstruct a portion of the signal if a discrete wavelet transform coefficients of the sets of discrete wavelet transform coefficients provided by the discrete wavelet transform components departs from a defined range of values associated with the coefficient; and
a fault analysis component configured to evaluate the reconstructed the portion of the signal to identify an anomaly represented by the coefficient falling outside of the defined range of values.

* * * * *